(12) United States Patent
Kissel

(10) Patent No.: US 7,373,664 B2
(45) Date of Patent: May 13, 2008

(54) PROACTIVE PROTECTION AGAINST E-MAIL WORMS AND SPAM

(75) Inventor: Timo S. Kissel, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 795 days.

(21) Appl. No.: 10/321,079

(22) Filed: Dec. 16, 2002

(65) Prior Publication Data

US 2004/0117648 A1 Jun. 17, 2004

(51) Int. Cl.
*G06F 11/00* (2006.01)
(52) U.S. Cl. .......................... 726/22; 713/188; 726/13
(58) Field of Classification Search ................ 713/188, 713/168, 153, 154; 726/11–13, 22–25; 709/206, 709/207, 223–225, 203; 704/100, 25, 26; 706/20, 47, 15, 25; 702/182, 193, 194, 192; 714/100, 25, 26
See application file for complete search history.

(56) References Cited

U.S. PATENT DOCUMENTS

| | | | |
|---|---|---|---|
| 5,495,607 A | 2/1996 | Pisello et al. | |
| 5,675,710 A | 10/1997 | Lewis | |
| 5,694,569 A | 12/1997 | Fischer | |
| 5,819,226 A * | 10/1998 | Gopinathan et al. | 705/44 |
| 5,826,249 A | 10/1998 | Skeirik | |
| 5,832,208 A * | 11/1998 | Chen et al. | 726/24 |
| 5,832,527 A | 11/1998 | Kawaguchi | |
| 5,884,033 A | 3/1999 | Duvall et al. | |
| 6,006,242 A | 12/1999 | Poole et al. | |
| 6,023,723 A | 2/2000 | McCormick et al. | |
| 6,052,709 A | 4/2000 | Paul | |
| 6,072,942 A | 6/2000 | Stockwell et al. | |
| 6,088,803 A | 7/2000 | Tso et al. | |
| 6,125,459 A * | 9/2000 | Andoh et al. | 714/55 |
| 6,161,130 A | 12/2000 | Horvitz et al. | |
| 6,167,434 A | 12/2000 | Pang | |
| 6,253,169 B1 | 6/2001 | Apte et al. | |
| 6,298,351 B1 | 10/2001 | Castelli et al. | |
| 6,347,310 B1 | 2/2002 | Passera | |
| 6,370,526 B1 | 4/2002 | Agrawal et al. | |
| 6,397,200 B1 | 5/2002 | Lynch, Jr. et al. | |
| 6,397,215 B1 | 5/2002 | Kreulen et al. | |

(Continued)

OTHER PUBLICATIONS

Wikipedia.org web pages (online). Wikipedia (retrieved Mar. 17, 2003). Retrieved from the Internet: <URL: http://www.wilipedia.org/w/wiki.phtml?title=_Machine_learning_&_printable=yes>.

(Continued)

*Primary Examiner*—Kim Vu
*Assistant Examiner*—Nirav Patel
(74) *Attorney, Agent, or Firm*—Fenwick & West LLP

(57) ABSTRACT

Methods, apparati, and computer-readable media for detecting the presence of malicious computer code in a plurality of e-mails. In a method embodiment of the present invention, the following steps are performed for each e-mail: calculating a feature vector (80), said feature vector (80) being representative of a presence of at least one preselected feature in the e-mail; calculating at least one score (S) based upon said feature vector (80), each said score (S) being representative of a frequency of occurrence of an instance of a feature; determining whether any score (S) exceeds a preselected malicious threshold representative of malicious computer code; and when a score (S) exceeds a preselected malicious threshold, blocking said e-mail.

24 Claims, 7 Drawing Sheets

U.S. PATENT DOCUMENTS

| | | | |
|---|---|---|---|
| 6,401,122 B1* | 6/2002 | Matsui et al. | 709/227 |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1* | 4/2003 | Kirsch | 709/206 |
| 6,721,721 B1 | 4/2004 | Bates et al. | |
| 6,732,273 B1* | 5/2004 | Byers | 713/193 |
| 6,751,789 B1 | 6/2004 | Berry et al. | |
| 6,757,830 B1* | 6/2004 | Tarbotton et al. | 713/188 |
| 6,772,346 B1 | 8/2004 | Chess et al. | |
| 6,778,941 B1* | 8/2004 | Worrell et al. | 702/176 |
| 6,792,412 B1* | 9/2004 | Sullivan et al. | 706/25 |
| 6,842,861 B1 | 1/2005 | Cox et al. | |
| 6,886,099 B1* | 4/2005 | Smithson et al. | 726/24 |
| 6,944,555 B2 | 9/2005 | Blackett et al. | |
| 6,944,821 B1 | 9/2005 | Blackett et al. | |
| 6,952,779 B1 | 10/2005 | Cohen et al. | |
| 6,973,578 B1 | 12/2005 | McIchionc | |
| 7,024,403 B2 | 4/2006 | Kyler | |
| 2001/0018685 A1* | 8/2001 | Saito et al. | 707/3 |
| 2002/0038308 A1 | 3/2002 | Cappl | |
| 2002/0046207 A1 | 4/2002 | Chino et al. | |
| 2002/0087649 A1 | 7/2002 | Horvitz | |
| 2002/0138525 A1 | 9/2002 | Karadimitriou et al. | |
| 2002/0147694 A1 | 10/2002 | Dempsey et al. | |
| 2002/0147782 A1 | 10/2002 | Dimitrova et al. | |
| 2002/0194489 A1* | 12/2002 | Almogy et al. | 713/200 |
| 2002/0199095 A1* | 12/2002 | Bandini et al. | 713/151 |
| 2002/0199186 A1 | 12/2002 | Ali et al. | |
| 2002/0199194 A1 | 12/2002 | Ali | |
| 2003/0023875 A1* | 1/2003 | Hursey et al. | 713/201 |
| 2003/0033587 A1 | 2/2003 | Ferguson et al. | |
| 2003/0061287 A1 | 3/2003 | Yu et al. | |
| 2003/0065926 A1* | 4/2003 | Schultz et al. | 713/188 |
| 2003/0088627 A1* | 5/2003 | Rothwell et al. | 709/206 |
| 2003/0110280 A1 | 6/2003 | Brock et al. | |
| 2003/0110393 A1* | 6/2003 | Brock et al. | 713/200 |
| 2003/0110395 A1 | 6/2003 | Presotto et al. | |
| 2003/0154394 A1* | 8/2003 | Levin | 713/200 |
| 2003/0167402 A1* | 9/2003 | Stolfo et al. | 713/200 |
| 2003/0233352 A1 | 12/2003 | Baker | |
| 2004/0015554 A1* | 1/2004 | Wilson | 709/206 |
| 2004/0049478 A1* | 3/2004 | Jasper et al. | 707/1 |
| 2004/0059697 A1* | 3/2004 | Forman | 706/46 |
| 2004/0103310 A1 | 5/2004 | Sobel et al. | |
| 2004/0117401 A1 | 6/2004 | Miyata et al. | |
| 2004/0117641 A1 | 6/2004 | Kennedy et al. | |
| 2004/0220975 A1 | 11/2004 | Carpentier et al. | |

OTHER PUBLICATIONS

Parkhouse, Jayne, "Pelican SafeTNet 2.0"[online]. Jun. 2000, SC Magazine Product Review, [retrieved on Dec. 1, 2003]. Retrieved from the Internet: <URL: http://www.scmagazine.com/scmagazine/standalone/pelican/sc_pelican.html.

outlook.spambully.com web pages [online]. Spam Bully [retrieved Jan. 16, 2003]. Copyright 2002. Retrieved from the Internet: <URL: http://outlook.spambully.com/about.php >.

cauce.org web pages [online]. Coalition Against Unsolicited Commercial Email [retrieved Mar. 17, 2003]. Retrieved from the Internet: <URL: http://www.cauce.org/about/problem.shtml>.

"Enterprise Protection Strategy", Trend Micro, Inc.; [online]; retrieved on Dec. 3, 2002. Retrieved from the internet: <URL: http://www.trendmicro.com/en/products/eps/features.htm.

"How To Test Outbreak Commander"; Trend Micro, Inc., Aug. 2002, pp. 1-13, Cupertino, CA.

* cited by examiner

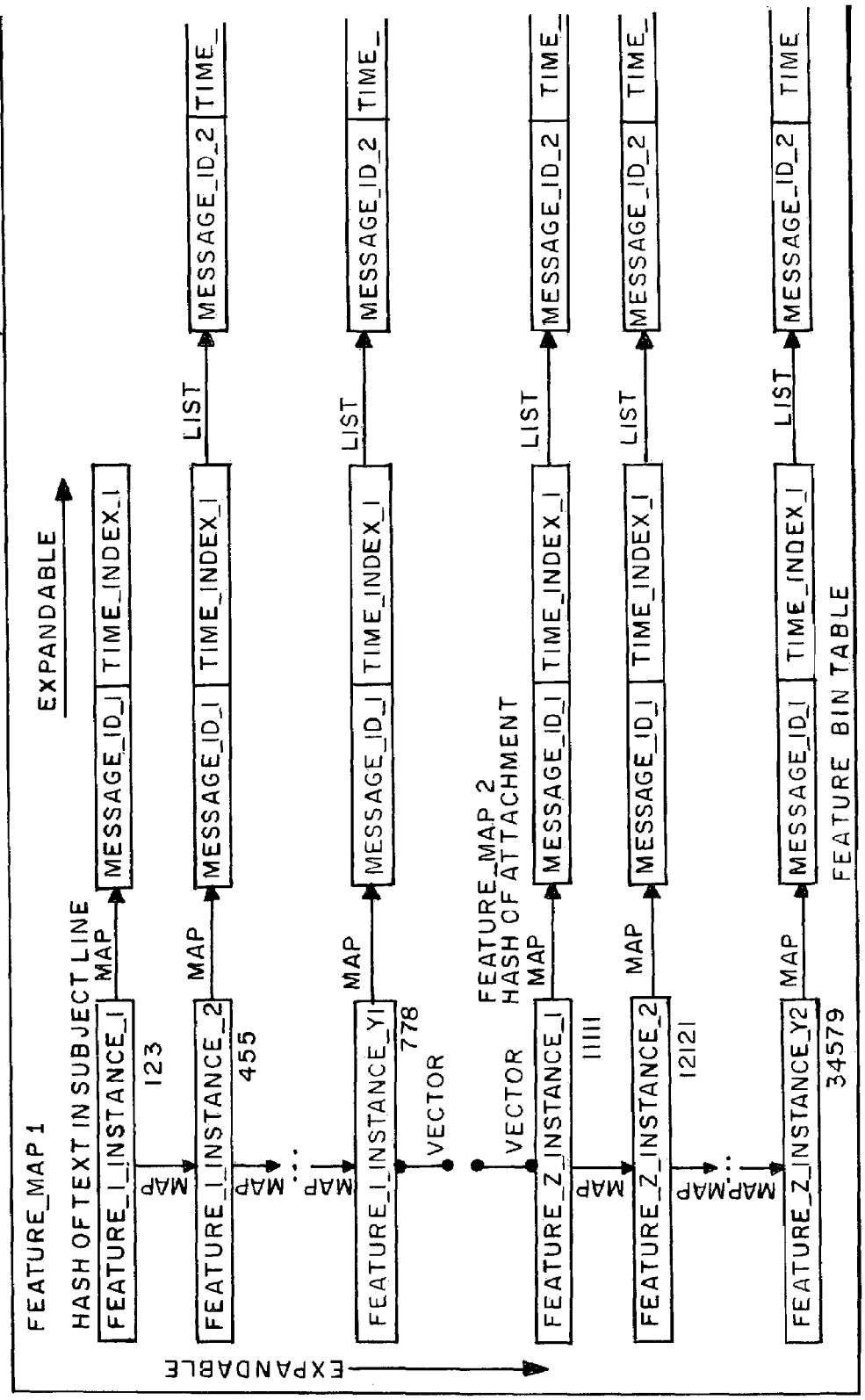

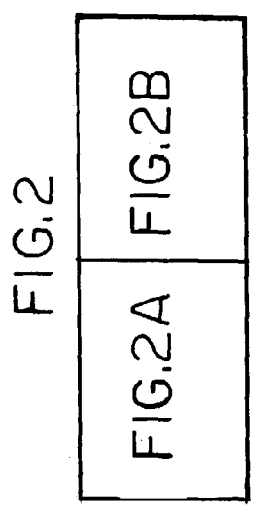
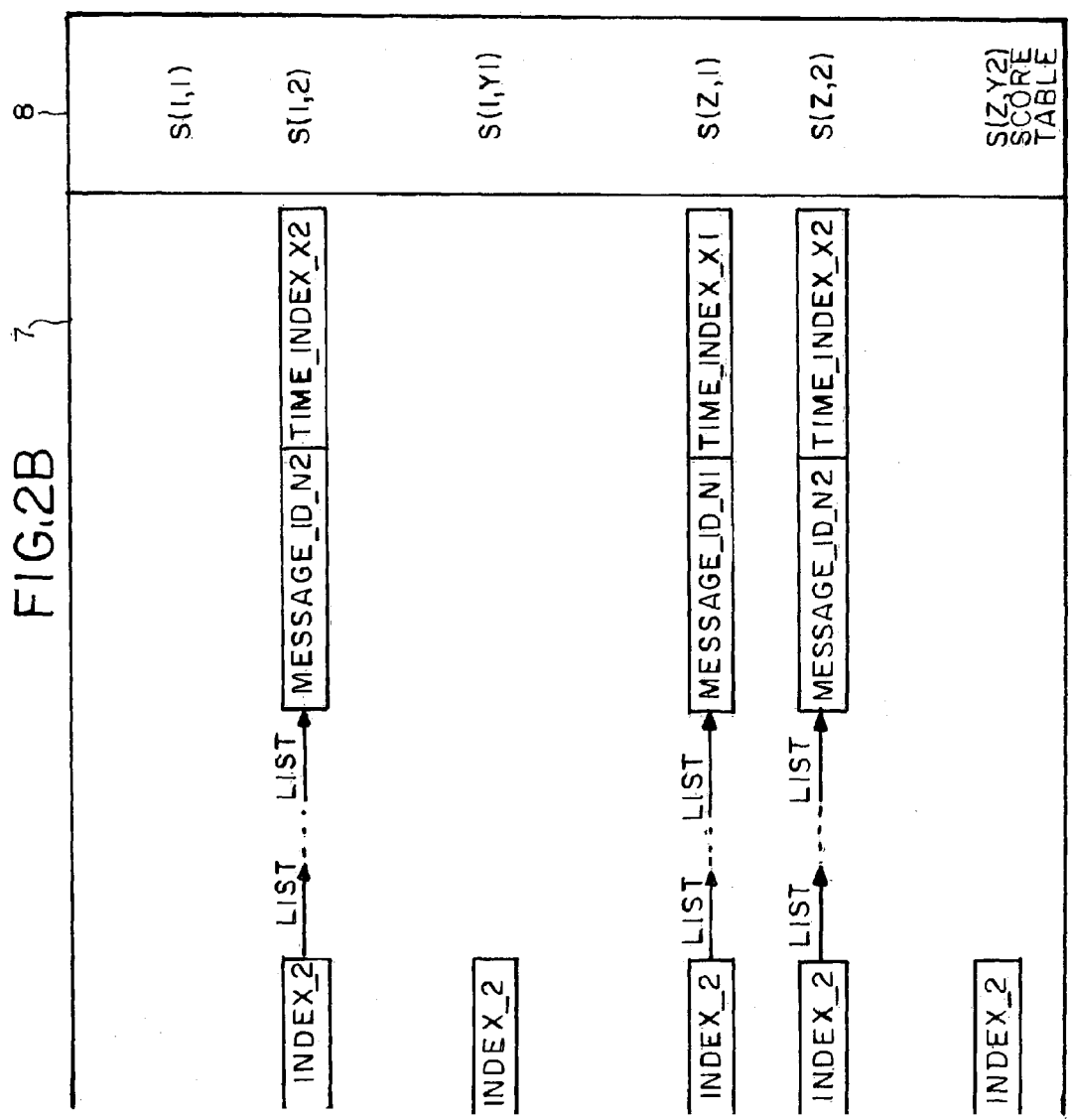

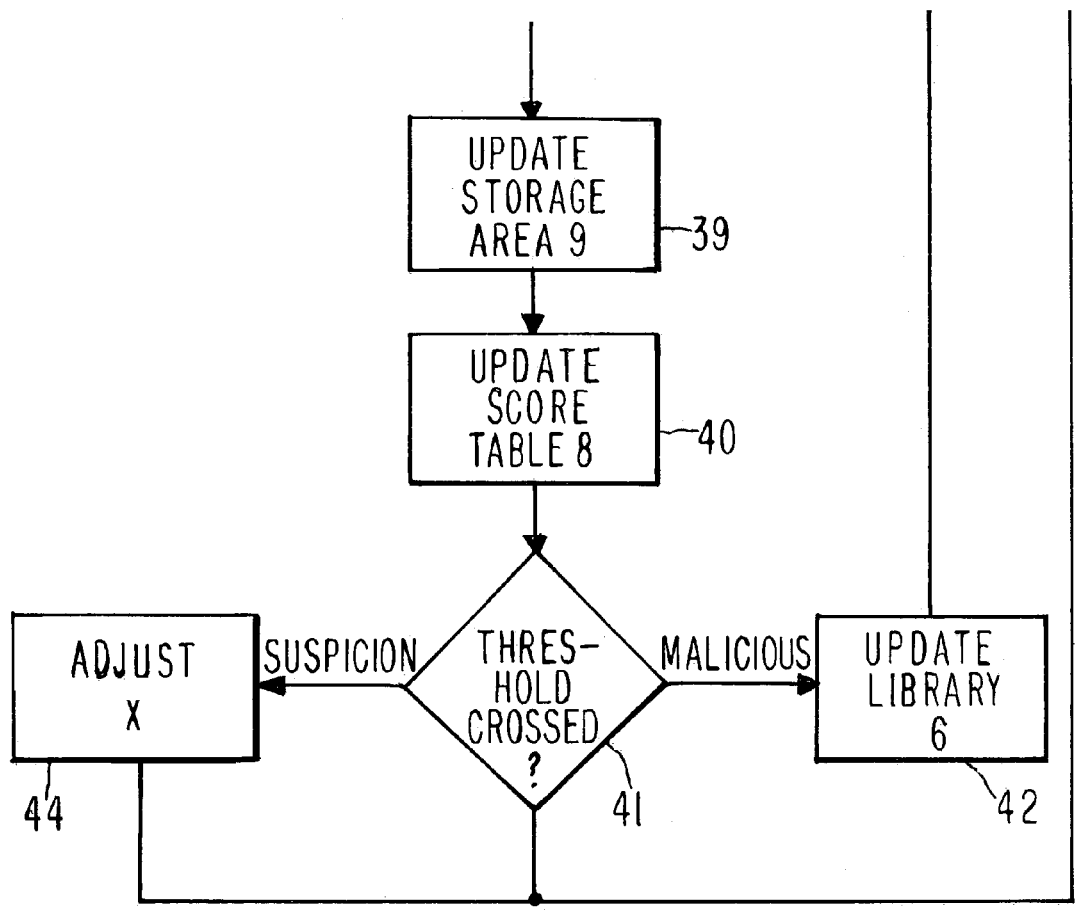
FIG.3B
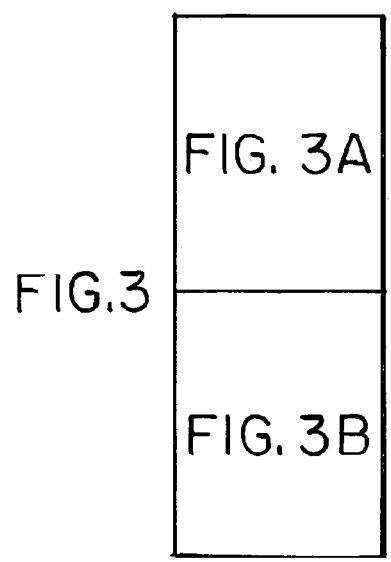

FIG. 4

| FEATURE 1 | 123 | —90(1) |
|---|---|---|
| FEATURE 2 | 12121 | —90(2) |

| FEATURE 1 | 789 | —90(3) |
|---|---|---|
| FEATURE 2 | 8133457 | —90(4) |

PROACTIVE PROTECTION AGAINST E-MAIL WORMS AND SPAM

TECHNICAL FIELD

This invention pertains to the field of preventing malicious attacks to computers, and, in particular, attacks to networked computers, where the attacking agent is a worm or spam sent via e-mail.

BACKGROUND ART

As used herein, "malicious computer code" is any computer code that enters a computer without an authorized user's knowledge and/or without an authorized user's consent. The malicious code typically performs malicious actions after it arrives on the user's computer. Malicious computer code that propagates from one computer to another over a network, e.g., via e-mail, is often referred to as a "worm" or "spam". A worm is self-propagating, e.g., after it enters a user's computer, it may spread to other computers by attaching itself to e-mails that are sent to addresses found in the first computer's address book. Spam, on the other hand, is unwanted e-mail received by a computer that does not self-propagate.

Various techniques have been proposed to protect computers against e-mail worms or spam. For example, one such system alerts a network administrator when a certain number of identical e-mails are detected. However, this system does not afford any proactive protection. It is merely an alerting scheme, leaving it up to the administrator to take appropriate action upon receiving the alert. In many cases, by the time the administrator does take action, the e-mail worm has already entered into the computer network, and any actions the administrator could take are merely reactions, such as manually blocking suspicious e-mail traffic and cleaning up the worm infection.

The present invention advances the state of the art in providing proactive protection against e-mail worms and spam.

DISCLOSURE OF INVENTION

Methods, apparati, and computer-readable media for detecting the presence of malicious computer code in a plurality of e-mails. In a method embodiment of the present invention, the following steps are performed for each e-mail: calculating a feature vector (80), said feature vector (80) being representative of a presence of at least one preselected feature in the e-mail; calculating at least one score (S) based upon said feature vector (80), each said score (S) being representative of a frequency of occurrence of an instance of a feature; determining whether any score (S) exceeds a preselected malicious threshold representative of malicious computer code; and when a score (S) exceeds a preselected malicious threshold, blocking said e-mail.

BRIEF DESCRIPTION OF THE DRAWINGS

These and other more detailed and specific objects and features of the present invention are more fully disclosed in the following specification, reference being had to the accompanying drawings, in which:

FIG. 2 is a data structure illustrating the contents of feature bin table 7 and score table 8 of the present invention.

FIG. 4 is an illustration of a feature vector 80 generated by method step 35 of FIG. 3.

FIG. 5 is an illustration of contents of blocked feature instances library 6.

DETAILED DESCRIPTION OF THE PREFERRED EMBODIMENTS

The present invention not only detects unknown e-mail worms and spam, but also automatically protects the computer network when it detects suspicious e-mail traffic, without requiring human intervention. The invention nevertheless comprises alerting a human system administrator once suspicious e-mail traffic is detected. This allows for flexibility in determining appropriate courses of action, analyzing for false positives, etc. During the time the system administrator is analyzing the situation, the computer network is being protected automatically. Thus, the invention is a proactive, fully automatic means for protecting computer networks from infection by malicious attacking agents including e-mail worms and spam.

Most e-mail worms and spam are e-mailed many times over to different e-mail addresses, with the e-mail content being substantially unaltered. Consequently, a computer network with a sufficient number of users will normally receive a large number of e-mail messages containing the worm or spam within a relatively short period of time. The present invention detects such clusters of e-mail messages in the input e-mail queue and/or the output e-mail queue of an e-mail gateway 2, and uses the detection of such clusters to remove suspicious e-mail from the rest of the e-mail traffic, thus blocking the spread of the worms and spam.

The motivation for detecting malicious code within incoming e-mail traffic is slightly different than the motivation for detecting malicious code within outgoing e-mail traffic. Detection and removal of suspicious e-mail traffic from the incoming e-mail queue results in proactive protection against unknown e-mail worms and spam. As suspicious e-mail is detected, the network is protected from becoming infected with the unknown worm or spam in the first place.

On the other hand, detection and removal of suspicious e-mail traffic from the outgoing e-mail queue implies that the network has already been infected with the worm or spam, but future spreading of same is prevented. This mitigates the enterprise's exposure to contractual or tort liability, by minimizing the risk that the computer network will act as a host for the spread of the malicious code. Furthermore, the present invention allows for quicker deployment of antivirus signatures to cleanse the network from the infection and prevent further infections by the same threat, thus diminishing the threat of re-infections.

Figure 1:
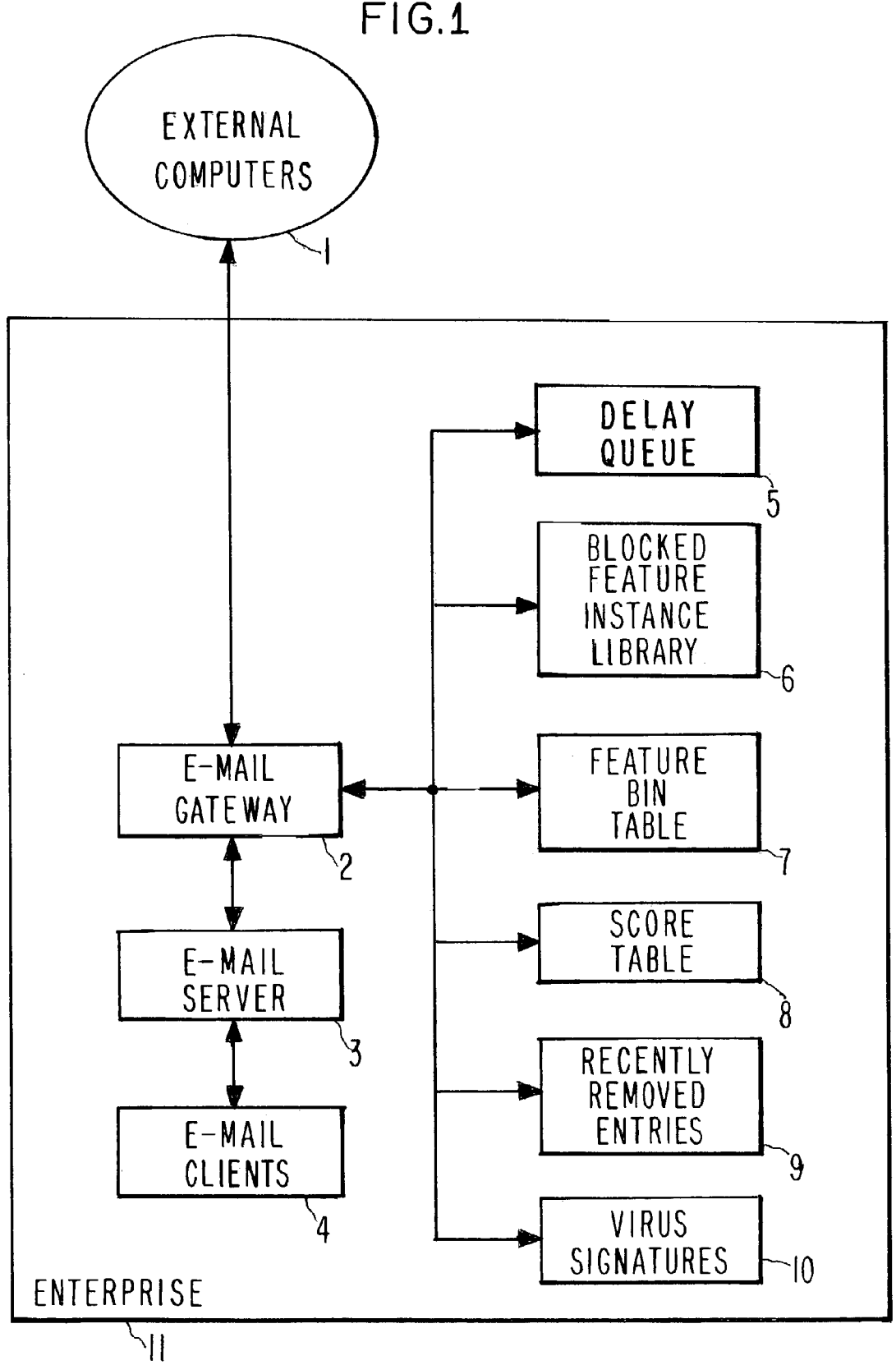
FIG. 1 is a system level diagram showing modules utilized in the present invention.

FIG. 1 illustrates modules suitable for implementing the present invention. The modules can be implemented in hardware, software, firmware, or any combination thereof. Modules 2, 3, and 4 are conventionally implemented in a combination of hardware and software. Modules 5 through 10 are conventionally implemented in software. The modules and portions of modules that are embodied in software can be readily stored on any portable or fixed medium or media, such as one or more hard disks, floppy disks, CD's, DVD's, etc.

The invention is typically used to protect an enterprise 11 (such as a business or a university) having an internal computer network. E-mail gateway 2 is an enterprise level computer that interfaces with computers 1 external to the enterprise 11. The outside computers 1 can be the Internet, a single external computer 1, or an external computer network 1. Gateway 2 contains modules 61-64 for implementing the method steps of the present invention (see FIG. 6).

E-mail server 3 is a computer for routing e-mail messages from and to gateway 2. Server 3 is coupled to a plurality of e-mail client computers 4. Computers 4 can send e-mail messages to and from each other via server 3, and to and from the external computers 1 via gateway 2. It should be noted that in a sufficiently large network, there can be more than one e-mail server 3, and/or more than one e-mail gateway 2.

FIG. 1 shows the inventive modules as being located at the e-mail gateway 2, but they could also be located at the e-mail server 3 or at one or more e-mail clients 4. As said modules move down within FIG. 1, they are exposed to fewer e-mails entering the network.

Coupled to gateway 2 is a delay queue 5, a storage area for temporarily holding e-mails while the method steps of the present invention are executed. As used herein, "coupled" means any type of direct or indirect coupling, or direct or indirect connection. Blocked feature instance library 6, also coupled to gateway 2, is a storage area containing exemplars of feature instances (values) that have been deemed to be indicative of malicious code. Feature bin table 7, also coupled to gateway 2, is a data structure by which the inventive modules within gateway 2 keep track of preselected features within the incoming or outgoing e-mails. Examples of e-mail features that may be tracked by the present invention include:

Contents of the subject line of the e-mail.
A hash of each e-mail attachment (or, not as commonly due to the normally large size of an e-mail attachment, the entire attachment itself).
The name of each e-mail attachment.
The size of each e-mail attachment.
A hash of the e-mail body.
Parsed script within the e-mail body or within an e-mail attachment.
A hash of parsed script within the e-mail body or within an e-mail attachment.

To illustrate the concept of "parsed script", let us examine the following example of what could be included within an e-mail body:

```
<HTML>
<SCRIPT language = "JavaScript">
<!--
    var userAgent=navigator.userAgent;
    ...
//-->
</SCRIPT>
```

We look only between the <SCRIPT> tags. What is there is script (code), in this case script in the JavaScript language.

We then parse the script using a parser, much like an interpreter would, to generate a tokenized representation of the script. We look for keywords. For example, after "var" (variable), we don't care what the variable is, so the parsed representation might be
    var*
    var*
    if* where * denotes anything

After this feature extraction step, we can generate a "deemed harmless" list. Examples of typical deemed harmless list items for Java Script include:
    A simple popup
    Something from a Website or book that tells one how to use Java Script.

We let the deemed harmless list items pass without further analysis.

Also coupled to gateway 2 is score table 8, a storage area that stores a current score S for each instance of each feature that is represented in feature bin table 7. Score S is a representation of the frequency of occurrence of each feature instance.

Also coupled to gateway 2 is recently removed entry storage area 9, which, consistent with one embodiment of how score S is calculated, contains recently removed entries from feature bin table 7, as will be more fully described below.

Finally, virus signatures 10 are also coupled to gateway 2. Signatures 10 are a set of distinguishing code portions of known malicious code, as conventionally used by antivirus software companies such as Symantec Corporation of Cupertino, Calif. for foiling attacks by known malicious code.

FIG. 2 is a representation of the contents of feature bin table 7 using some C++ notation, and the contents of score table 8. Feature bin table 7 in this illustration contains Z feature maps, where Z is a positive integer. Each feature map corresponds to one feature that has been preselected to be examined by gateway 2. For example, feature 1 may be the hash of the text in the subject line of each e-mail to be analyzed. FIG. 2 illustrates that there may be Y1 instances of feature 1, where Y1 is any positive integer. For example, instance 1 may be the bit sequence 123, i.e., the hash of the text in the subject line of certain e-mails that are analyzed using a preselected hash algorithm is 123. Instance 2 of feature 1 may be 455, and instance Y1 of feature 1 may be 778.

Feature bin table 7 is designed so that the number of entries is expandable in both the horizontal and vertical directions. The horizontal direction represents the number of e-mails having that instance of that feature. The vertical direction represents the number of preselected features to be analyzed.

Feature Z may be the hash of an e-mail attachment. Instance 1 of feature Z may be 11111. Instance 2 of feature Z may be 12121. Instance Y2 of feature Z may be 34579. Y2 is the number of instances of feature Z represented in feature bin table 7, and is any positive integer. In the feature bin table 7 illustrated in FIG. 2, there is one entry for feature 1 instance 1, N2 entries for feature 1 instance 2, two entries for feature 1 instance Y1, N1 entries for feature Z instance 1, N2 entries for feature Z instance 2, and two entries for feature Z instance Y2. N1 and N2 are any positive integers. Each entry comprises a message ID, uniquely identifying the e-mail from which that particular feature has been extracted, and a timestamp (time index) indicating when that e-mail arrived at gateway 2.

Score table 8 works in conjunction with feature bin table 7. Score table 8 contains one entry (score S) for each instance of each feature represented in feature bin table 7. Thus, S(1, 1) is the current score for feature 1 instance 1; S(1,Y1) is the current score for feature 1 instance Y1; etc.

Figure 3A:
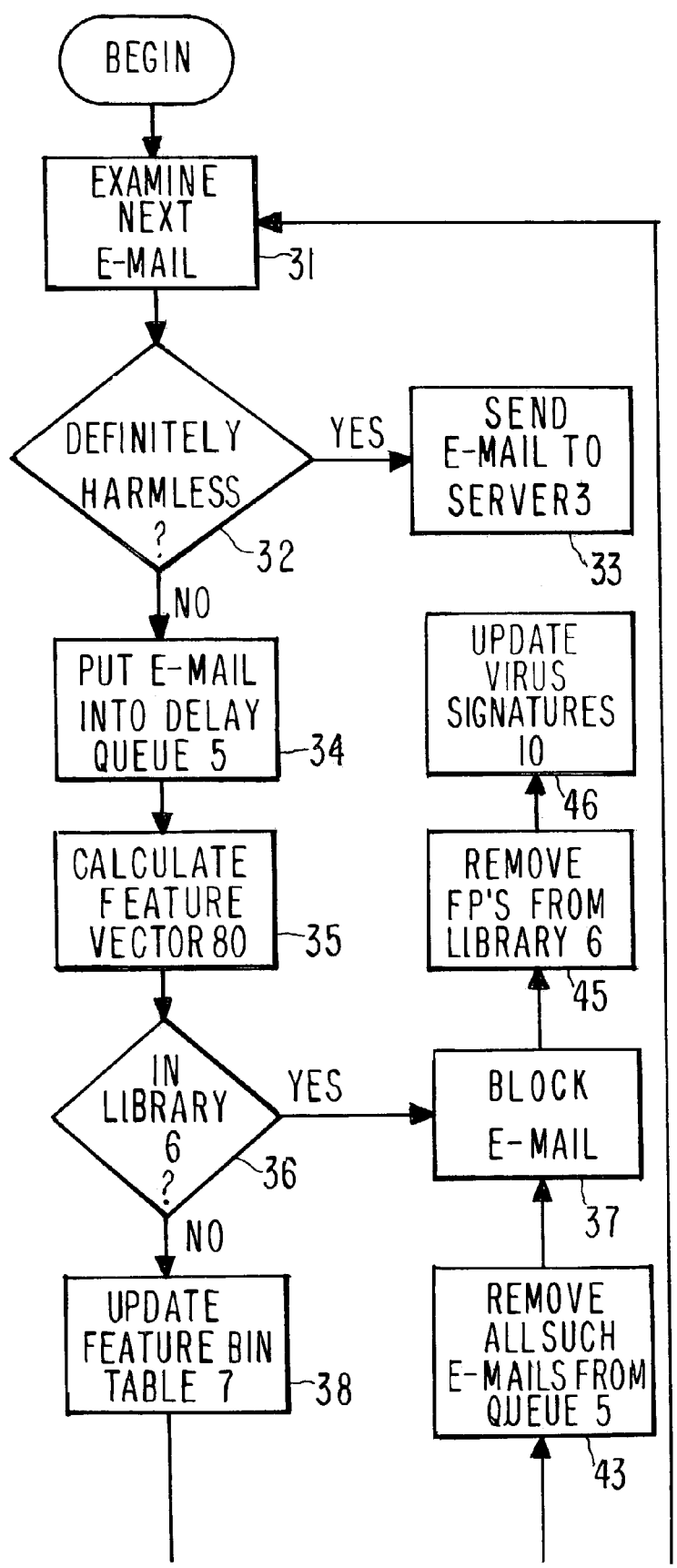
FIG. 3 is a flow diagram illustrating a method embodiment of the present invention.

Turning to FIG. 3, the method begins at step 31 with an examination of the next e-mail arriving at gateway 2. When the method is first executed, the next e-mail is the first e-mail. At optional step 32, gateway 2 inquires whether the e-mail is deemed to be definitely harmless according to a set of preselected criteria. This preselected criteria may include:

The e-mail has no attachments.

The e-mail has no script content in its e-mail body.

When the e-mail is deemed to be definitely harmless in step 32, gateway 2 sends the e-mail to server 3 in step 33.

If the e-mail is not deemed to be definitely harmless at step 32, at step 34 gateway 2 places the e-mail into delay queue 5 for a preselected amount of time X. Time X allows the other method steps illustrated in FIG. 3 to be executed prior to a default determination that the e-mail is harmless. In other words, if the remaining method steps illustrated in FIG. 3 do not affirmatively indicate that an e-mail contains malicious code, the e-mail is automatically released from delay queue 5 and sent to server 3 after a period of time X.

At step 35, gateway 2 calculates a feature vector 80 for the e-mail, based upon the preselected set of features. As an example, assume that there are two features to be examined, the two features that were described above in conjunction with FIG. 2. Then feature vector 80 thus normally contains two entries 90, one for each feature. FIG. 4 illustrates that as an example, feature 1 is calculated to be 123; this corresponds to instance 1 of feature 1 on FIG. 2. Feature 2 is calculated to be 12121, which corresponds to instance 2 of feature Z on FIG. 2.

At step 36, gateway 2 inquires whether a feature entry 90 calculated in step 35 corresponds to a blocked feature instance deemed to be indicative of malicious code, as stored in library 6. In the example illustrated in FIG. 5, there are only two feature instances (90(3) and 90(4)) that have been determined previously to be indicative of malicious code. The only instance for feature 1 that has been determined to be malicious is 789. This may represent, for example, the hash of "with love from Pamela" in the subject line of the e-mail. This does not match the instance 90(1) of feature 1 extracted in step 35 and illustrated in FIG. 4. Similarly, the only instance of feature 2 previously found to have been associated with malicious code is 8133457, as illustrated in FIG. 5. This could be the hash of an e-mail attachment containing a worm. This does not match the instance 90(2) of feature 2 illustrated in FIG. 4 either. Since neither feature instance matches, the method proceeds to step 38. If, however, one of the feature instances had matched a blocked feature instance contained in library 6, the method would have proceeded to step 37, where the e-mail, now deemed to contain malicious code, is blocked. As used herein, "blocked" can mean at least one of the following:

The system administrator is alerted to the problem.

The e-mail is deleted from delay queue 5.

The e-mail is quarantined and sent to an antivirus research center such as Symantec Antivirus Research Center in Santa Monica, Calif.

The e-mail is analyzed by the system administrator for a possible false positive declaration of malicious code.

The determination of a false positive can be accomplished by any conventional means, such as determining that a verified digital signature has been affixed to the e-mail by a trusted third party or by visual inspection of the e-mail contents and/or attachments. At optional step 45, the system administrator is given the authority to remove an entry from library 6 when said administrator has found a false positive.

At optional step 46, the signature of the malicious code is placed into virus signatures storage area 10, and the entry is removed from library 6. By this technique, gateway 2 (and other computers, within or without the confines of enterprise 11) can use virus signatures 10 rather than library 6 for screening out this malicious code in the future.

If none of the feature instances extracted in 35 correspond to an entry in library 6, step 38 is entered, during which gateway 2 updates feature bin table 7 with one entry for each feature that has been extracted. As stated previously, an entry consists of a message ID and a time index. At step 39, gateway 2 checks the timestamps of all of the entries within feature bin table 7. If any entry has a timestamp outside a preselected window of time Q (which is the sample time used in calculating score S), that entry is removed from feature bin table 7 and placed into recently removed entry storage area 9, which stores those entries that have been removed from table 7 since the last time the method steps of FIG. 3 were executed.

At step 40, all scores S in score table 8 are updated. At step 41, gateway 2 determines whether any of the recently updated scores exceed a preselected malicious threshold for that score, indicative of malicious code. If this malicious threshold has been crossed, library 6 at step 42 is updated with an entry corresponding to the offending feature instance. Then, at step 43, all e-mails in queue 5 containing this feature instance are deleted, and the method reverts to step 37.

In one embodiment, a second threshold for each score S is also pre-established: a threshold representing not malicious code but a suspicion of malicious code. In this embodiment, at step 41, gateway 2 further asks whether this suspicion threshold has been crossed. For example, assume that the score S for a particular feature was 4 in the previous iteration of the method of FIG. 3, the present score S is 6, and the suspicion threshold is 5. Thus, the suspicion threshold has been crossed, and crossed in a positive (upwards) direction. Then, at optional step 44, X is adjusted, also in a positive direction because the suspicion threshold has been crossed in a positive direction. This increases the time that e-mails, including e-mails presently in queue 5 and e-mails to be placed into queue 5 later, are made to languish in queue 5. The rationale behind optional step 44 is that, while the score S is not deemed to be sufficiently high to make a declaration of malicious code, it is suspiciously moving in that direction, and therefore this warrants that time X be increased a bit. Every time the suspicion threshold has been crossed upwardly, X can be increased a bit more, up to a preselected maximum. Similarly, if the suspicion threshold is crossed in a negative direction, X can be decreased, but it should not be decreased below Q. When X is adjusted in step 44, it can be adjusted for just those e-mails having the feature instance whose score S crossed the suspicion threshold; or it can be adjusted for all e-mails.

Normally, the malicious threshold and the suspicion threshold are the same for each S, regardless of feature instance.

Figure 6:
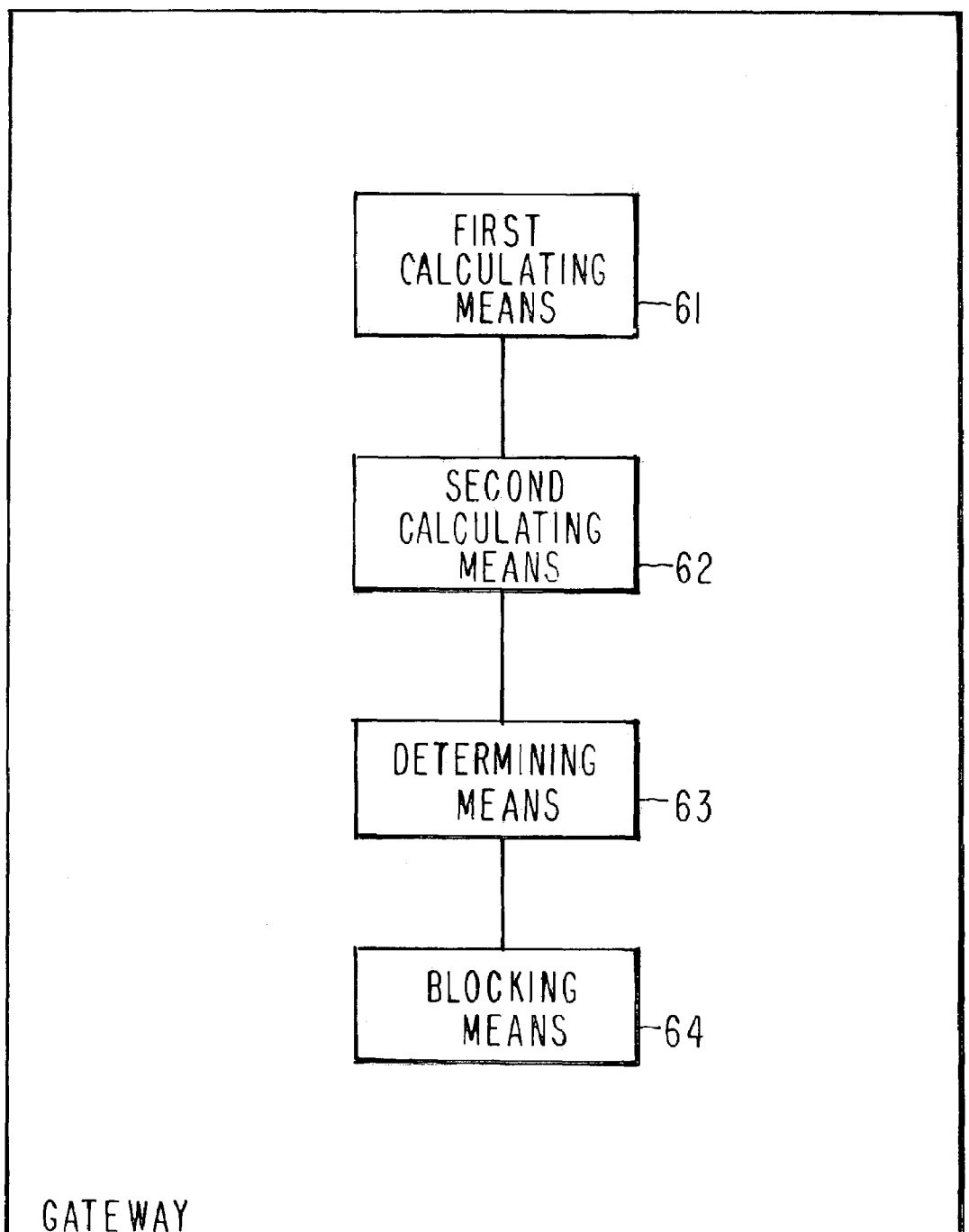
FIG. 6 is a block diagram of modules 61-64 suitable for implementing the present invention.

The method steps of the present invention can be carried out by hardware, firmware, and/or software modules 61 through 64 as illustrated in FIG. 6. Modules 61 through 64 may be contained within gateway 2, or, alternatively, may be contained within a separate computer coupled to gateway 2. First calculating means 61, which may comprise a central processing unit, registers, memory cells, and other conventional calculating means, performs step 35 for each incoming or outgoing e-mail that arrives at gateway 2: calculating feature vector 80. Second calculating means 62, which may comprise a CPU, registers, memory cells, and other conventional calculating means, performs steps 38 and 39 for each incoming or outgoing e-mail arriving at gateway 2: calculating at least one score S based upon said feature vector 80, each S being representative of a frequency of occurrence of an instance of one of the preselected features.

First calculating means 61 and second calculating means 62 may consist of the same module or modules. Alternatively, module 61 is coupled to module 62. Module 62 is coupled to module 63, and module 63 is coupled to module 64.

Determining means 63, which comprises conventional comparison logic, performs step 41: determining whether a score S exceeds a preselected malicious threshold representative of malicious code. Blocking means 64, comprising conventional computer logic, performs step 37: blocking the e-mail when a score S exceeds a preselected malicious threshold.

In one embodiment, score S consists of the following three components:
1. A number T of entries in table 7 in the current time window Q.
2. A decaying weighted value R representing recently removed entries from table 7.
3. A "memory" decaying weighted value P of all previously calculated score(s) S. Consequently, the total score S is calculated as follows:

$$S = T + w_R \cdot R + w_P \cdot P$$

$w_R$ and $w_P$ are weighting factors to parameterize the weighting of R and P.

To obtain T, module 62 simply counts the number of entries remaining in feature bin table 7 after removing all entries that fall outside of the evaluation time window Q.

In order to obtain R and P, the concept of a decay function d is introduced. This function is used as a weighting factor to weigh entries depending on their difference in time from another entry. This function has the following properties:
1. For time 0, its value is 1 (as its weight should be 1 for no time difference).
2. For a definable time difference h, its value is 0.5 (this allows for the definition of a "half decay point" h in time).
3. As a time difference t approaches infinity, its value approaches 0.

The following decay function $d_h(t)$ has these properties (with t being a time difference and h being the definable "half decay point" in time):

$$d_h(t) = \frac{h}{t+h}$$

To obtain R, module 62 uses the following equation:

$$R = \sum_i d_h(c - r_i) = \sum_i \frac{h_R}{(c - r_i) + h_R}$$

Here, the $r_i$ are the times of all entries removed from the feature bin table 7, c is the current time, and i is the index of all removed entries since the last time S was updated. $c - r_i$ must be greater than Q, or else the entry wouldn't get into this expression.

To obtain P, module 62 uses the following equation:

$$P = d_h(c - c_{prev}) \cdot S_{prev} = \frac{S_{prev} \cdot h_P}{(c - c_{prev}) + h_P}$$

Here, c is the current time, $c_{prev}$ is the time stamp of the previous (last) entry in feature bin table 7 (i.e., the time of the last score calculation for the bin), and $S_{prev}$ is the previous (last) total score calculated for this feature instance. Initially, this third term P should be zero, because there is no previous score S. So, to accomplish this, we set $S_{prev}=0$ initially. This third term P takes into account just one entry deletion, the most recent deletion. We can have different h's for the second and third terms ($h_R$ and $h_P$, respectively). It doesn't matter whether $h_R$ is greater than $h_P$, $h_P$ is greater than $h_R$, or they are the same.

Consequently, the total score S is calculated by module 62 as follows:

$$S = T + w_R \cdot \sum_{i=1}^{n} \frac{h_R}{(c - r_i) + h_R} + w_P \cdot \frac{S_{prev} \cdot h_P}{(c - c_{prev}) + h_P}$$

It should be noted that for the edge condition of multiple timestamps arriving at gateway 2 at exactly the same point in time, the following simplified expression results for the calculation of score S:

$$S = T + w_P \cdot S_{prev}$$

The effectiveness of this technique for calculating the frequency score S depends on appropriate values for $w_R$, $w_P$, $h_R$, and $h_P$. These values should be determined empirically, so that S can be tuned to provide meaningful results on real-world data. To determine these values empirically, one can set up a test network representing a (scaled-down) model of an enterprise 11 computer network. Then, a set of known e-mail worms (with their malicious payload removed) are introduced into this model network while the algorithm for calculating S described above is running. The algorithm is modified to merely log the feature vectors 80 of all incoming and outgoing messages passing through the model e-mail gateway 2, along with their timestamps. The spreading characteristics of the e-mail worms are then captured in these feature vector/timestamp logs.

Then, an offline analysis is performed on these logs to investigate an optimum combination of values for $w_R$, $w_P$, $h_R$, and $h_P$, as well as the time window size Q. Since this is a multi-parameter optimization problem that is further complicated by different spreading characteristics of different (known and unknown) e-mail worms, a multi-parameter non-linear best fit (in the least mean squares sense) optimization algorithm (such as a neural network) can advantageously be used. However, visual investigation of the worm spreading characteristics, along with manual "tweaking" of the scoring parameters, may result in a satisfactory set of parameters. This manual setting of the scoring parameters also gives system administrators the option to customize the behavior of the invention, in particular, the false positive threshold appropriate for their computing environment.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for detecting the presence of malicious computer code in a plurality of e-mails, said method comprising, for each e-mail, the steps of:
    calculating a feature vector, said feature vector being representative of a presence of a plurality of preselected features in the e-mail, wherein a feature bin table is updated with an entry for each preselected feature and wherein at least one preselected feature is based on a file attached to the e-mail and at least one preselected feature is based on a script associated with the email;
    calculating at least one decaying weighted score based upon said feature vector, wherein each said score is calculated based on a number of entries in the feature bin table within a current time window, an application of a first decay function to a value which indicates a number of deleted entries in the feature bin table and an application of a second decay function to at least a first previously calculated at least one score based upon said feature vector;
    determining whether any score exceeds a preselected malicious threshold representative of malicious computer code; and
    when a score exceeds a preselected malicious threshold, blocking said e-mail.

2. The method of claim 1 wherein a feature vector is not calculated when the e-mail is deemed to be harmless according to preselected criteria.

3. The method of claim 2 wherein said preselected criteria include criteria from the group comprising:
    the e-mail has no attachments; and
    the e-mail contains no script.

4. The method of claim 1 further comprising, prior to executing the first calculating step, the step of placing the e-mail into a delay queue for a preselected time X while the method steps of claim 1 are performed.

5. The method of claim 4 further comprising the steps of:
    determining whether the score S crosses a preselected suspicion threshold; and
    when S crosses the preselected suspicion threshold, adjusting X.

6. The method of claim 5 wherein X is adjusted for all e-mails having the feature instance corresponding to S.

7. The method of claim 5 wherein X is increased when the suspicion threshold is crossed in a positive direction.

8. The method of claim 5 wherein X is decreased when the suspicion threshold is crossed in a negative direction.

9. The method of claim 4 further comprising, when the score is greater than the malicious threshold, removing from the delay queue all e-mails having a feature instance corresponding to the feature instance having the score that exceeded the malicious threshold.

10. The method of claim 1 wherein the feature vector comprises at least one entry, said method further comprising the steps of:
    comparing each entry in the feature vector with entries in a pre-established blocked feature instance library; and
    when an entry in the feature vector matches an entry in the blocked feature instance library, blocking said e-mail.

11. The method of claim 10 further comprising the step of removing false positives from the blocked feature instance library.

12. The method of claim 1 further comprising the step of updating, for each e-mail, the feature bin table, said updating comprising augmenting the feature bin table with one entry for each instance of each feature.

13. The method of claim 12 wherein each score S has three components:
    a first component representative of the number of entries in the feature bin table within the current time window Q;
    a decaying weighted value R representing the entries recently deleted from the feature bin table; and
    a memory decaying weighted value P taking into account all of the previously calculated scores S for that feature instance.

14. The method of claim 13 wherein S is calculated using an algorithm containing parameters that are determined empirically.

15. The method of claim 12 wherein each feature bin table entry comprises an identifier of the e-mail and a time stamp.

16. The method of claim 12 farther comprising the step of determining whether a current time of arrival of the e-mail exceeds a time of a first entry in the feature bin table for that feature instance by more than a preselected sample time Q, and when the current time so exceeds said time of first entry, placing all feature bin table entries for that feature instance whose times are older than the current time by more than Q into a recently removed entry storage area.

17. The method of claim 1 wherein each score is recalculated whenever a feature vector is calculated.

18. The method of claim 1 wherein the blocking step comprises at least one of the following:
    alerting a system administrator;
    deleting the e-mail;
    quarantining the e-mail; and
    analyzing the e-mail.

19. The method of claim 1 farther comprising the step of updating a virus signature library when a score exceeds the preestablished malicious threshold.

20. The method of claim 1 wherein said plurality of e-mails seek to enter an enterprise from outside the enterprise.

21. The method of claim 1 wherein said plurality of e-mails seek to exit an enterprise en route to locations outside the enterprise.

22. The method of claim 1 wherein at least one preselected feature is a feature from the following group of features:
    contents of a subject line of the e-mail;
    an e-mail attachment;
    a hash of an e-mail attachment;
    a name of an e-mail attachment;
    a size of an e-mail attachment;
    a hash of an e-mail body;
    parsed script within the e-mail body;
    a hash of parsed script within the e-mail body;
    parsed script within an e-mail attachment;
    a hash of parsed script within an e-mail attachment.

23. A computer-readable storage medium containing computer program instructions for detecting the presence of malicious computer code in a plurality of e-mails, said computer program instructions performing, for each e-mail, the steps of:
    calculating a feature vector, said feature vector being representative of a presence of a plurality of preselected features in the e-mail, wherein a feature bin table is updated with an entry for each preselected feature and at least one preselected feature is based an a script associated with the email;

calculating at least one decaying weighted score based upon said feature vector, wherein each said score is calculated based an a number of entries in the feature bin table within a current time window, an application of a first decay function to a value which indicates a number of deleted entries in the feature bin table, and an application of a second decay function to at least a first previously calculated at least one score based upon said feature vector;

determining whether any score exceeds a preselected malicious threshold representative of malicious computer code; and when a score exceeds a preselected malicious threshold, blocking said e-mail.

24. Apparatus for detecting the presence of malicious computer code in a plurality of e-mails, the apparatus comprising:

a processor configured to execute a method, said method comprising:

calculating a feature vector for each e-mail, said feature vector being representative of a presence of a plurality of preselected features in the e-mail, wherein a feature bin table is updated with an entry for each preselected feature and at least one preselected feature is based an a script associated with the email;

calculating for each e-mail at least one decaying weighted score based upon said feature vector, wherein each said score is calculated based on a number of entries in the feature bin table within a current time window, an application of a first decay function to a value which indicates a number of deleted entries in the feature bin table, and an application of a second decay function to at least a first previously calculated at least one score based upon said feature vector;

determining whether any score exceeds a preselected malicious threshold representative of malicious computer code; and blocking said e-mail when a score exceeds a preselected malicious threshold.

* * * * *

UNITED STATES PATENT AND TRADEMARK OFFICE
CERTIFICATE OF CORRECTION

PATENT NO. : 7,373,664 B2 Page 1 of 1
APPLICATION NO. : 10/321079
DATED : May 13, 2008
INVENTOR(S) : Timo S. Kissel It is certified that error appears in the above-identified patent and that said Letters Patent is hereby corrected as shown below:

Claim 16, Column 10, Line 18, please replace - "farther" with -- further --.

Claim 19, Column 10, Line 34, please replace - "farther" with -- further --.

Claim 23, Column 10, Line 66, please replace - "an" with -- on --.

Claim 23, Column 11, Line 3, please replace - "an" with -- on --.

Claim 24, Column 12, Line 4, please replace - "an" with -- on --.

Signed and Sealed this

Second Day of September, 2008

JON W. DUDAS
*Director of the United States Patent and Trademark Office*